United States Patent
Tang et al.

(10) Patent No.: US 9,141,217 B2
(45) Date of Patent: Sep. 22, 2015

(54) POLARIZER MODULE, METHOD OF MANUFACTURING THE SAME AND TOUCH SCREEN USING THE SAME

(71) Applicant: Nanchang O-film Optical Display Technology Co., Ltd., Nanchang, Jiangxi (CN)

(72) Inventors: Genchu Tang, Guangdong (CN); Shengcai Dong, Guangdong (CN); Wei Liu, Guangdong (CN); Bin Tang, Guangdong (CN); Shilei He, Guangdong (CN)

(73) Assignee: NANCHANG O-FILM OPTICAL DISPLAY TECHNOLOGY CO., LTD., Nanchang, Jiangxi (CN)

( * ) Notice: Subject to any disclaimer, the term of this patent is extended or adjusted under 35 U.S.C. 154(b) by 0 days.

(21) Appl. No.: 14/229,266

(22) Filed: Mar. 28, 2014

(65) Prior Publication Data

US 2014/0293161 A1    Oct. 2, 2014

(30) Foreign Application Priority Data

Mar. 30, 2013   (CN) .......................... 2013 1 0108595

(51) Int. Cl.
G02F 1/1333    (2006.01)
G06F 3/041     (2006.01)
G06F 3/044     (2006.01)

(52) U.S. Cl.
CPC .............. *G06F 3/041* (2013.01); *G06F 3/044* (2013.01); *G06F 2203/04103* (2013.01); *Y10T 156/10* (2015.01)

(58) Field of Classification Search
CPC .............. G02F 1/13338; G06F 3/0202; G06F 2203/04103; G06F 3/044; G06F 3/0412
USPC ............................. 345/173, 174; 178/18.06
See application file for complete search history.

(56) References Cited

U.S. PATENT DOCUMENTS

| | | | |
|---|---|---|---|
| 2012/0327021 A1* | 12/2012 | Ryu et al. | 345/174 |
| 2014/0022199 A1* | 1/2014 | Peng et al. | 345/174 |
| 2014/0036166 A1* | 2/2014 | Kurasawa et al. | 349/12 |
| 2014/0152917 A1* | 6/2014 | Lee et al. | 349/12 |
| 2014/0293149 A1* | 10/2014 | Tang et al. | 349/12 |
| 2014/0295127 A1* | 10/2014 | Tang et al. | 428/67 |
| 2015/0062710 A1* | 3/2015 | Grillmayer et al. | 359/585 |

* cited by examiner

*Primary Examiner* — Priyank Shah
(74) *Attorney, Agent, or Firm* — Muncy, Geissler, Olds & Lowe, P.C.

(57) ABSTRACT

A polarizer module includes a polarizer substrate, an adhesive layer coated on the polarizer substrate, and a conductive layer embedded in the adhesive layer. The conductive layer includes a first conductive pattern and a second conductive pattern spaced apart from each other in the extending direction of the adhesive layer to form a sensing structure. The polarizer module can implement touch operation and output polarization light. A touch screen using the polarizer module is also provided.

10 Claims, 13 Drawing Sheets

POLARIZER MODULE, METHOD OF MANUFACTURING THE SAME AND TOUCH SCREEN USING THE SAME

FIELD OF THE INVENTION

The present disclosure relates to a field of touch screen, and more particularly relates to a polarizer module, a method of manufacturing the polarizer module and a touch screen using the same.

BACKGROUND OF THE INVENTION

The touch panel is a sensing device capable of receiving a touch input signal. The touch panel brings a new appearance for information exchange, which is a new appealing information interactive device. The development of touch panel technology has aroused widespread concern from information media on home and abroad; and the touch panel technology has become a booming high-tech industry in the optoelectronics.

Currently, an electronic product with touch control and displaying functions generally includes display screen and a touch panel added on the display screen. However, the touch panel, as an independent component from the display screen, needs to be ordered according to a size of the display screen when used in electronic product to achieve human-machine interaction, and then be assembled. There are mainly two different existed ways for the assembly of the touch panel and the display screen, i.e. a frame attach and a full attach. The frame attach is to attach the edge of the touch screen to the edge of the display screen, and the full attach is to attach an entire lower surface of the touch screen to an entire upper surface of the display screen.

The display screen, as an assembly module of polarizer, optical filter, liquid crystal module, and TFT and so on, has a great thickness. Simultaneously, the display screen and the touch panel are two independent components. During assembly of the electronic product, a complex assembly process is needed to assemble the display touch screen and the touch panel together. This further increases the thickness and the weight of the electronic products in the assembly of the touch display screen. Moreover, one more assembly process would cause an increase, of the probability of undesired products and the manufacturing cost.

SUMMARY OF THE DISCLOSURE

Accordingly to this, the present disclosure is directed to a polarizer module, a method of manufacturing the polarizer module, and a touch screen using the polarizer module, which can reduce the thickness of the electronic devices.

A polarizer module includes a polarizer substrate, an adhesive layer coated on the polarizer substrate, and a conductive layer embedded in the adhesive layer. The conductive layer includes a first conductive pattern and a second conductive pattern spaced apart from each other in the extending direction of the adhesive layer to form a sensing structure.

A touch screen includes a TFT electrode, liquid crystal module, a common electrode, a filter module, and the polarizer module, which are laminated sequentially.

A method of manufacturing a polarizer module includes the steps:
providing a polarizer substrate;
coating an adhesive layer on the polarizer substrate; and
embedding a conductive layer in the adhesive layer, wherein the conductive layer comprises a first conductive pattern and a second conductive pattern spaced apart from each other in the extending direction of the coating layer to form a sensing structure.

The polarizer module of the touch screen can implement touch operation and output polarization light. As an indispensable component of the touch screen, the polarizer module enables the touch screen to have a touch function. There is no need to assembly a touch panel on the display screen, which can help to reduce the thickness of the electronic devices.

BRIEF DESCRIPTION OF THE DRAWINGS

The components in the drawings are not necessarily drawn to scale, the emphasis instead being placed upon clearly illustrating the principles of the present disclosure. The following drawings provide specific details for a thorough understanding of and enabling description for these embodiments.

DETAILED DESCRIPTION OF THE EMBODIMENTS

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," ""above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

A polarizer module, a method of manufacturing the polarizer module, and a touch screen using the polarizer module are provided in the present disclosure, which can reduce the thickness of the electronic devices. The polarizer module can implement touch operation and output polarization light, thus it can enable the touch screen to have the function of touch and display.

Figure 1:
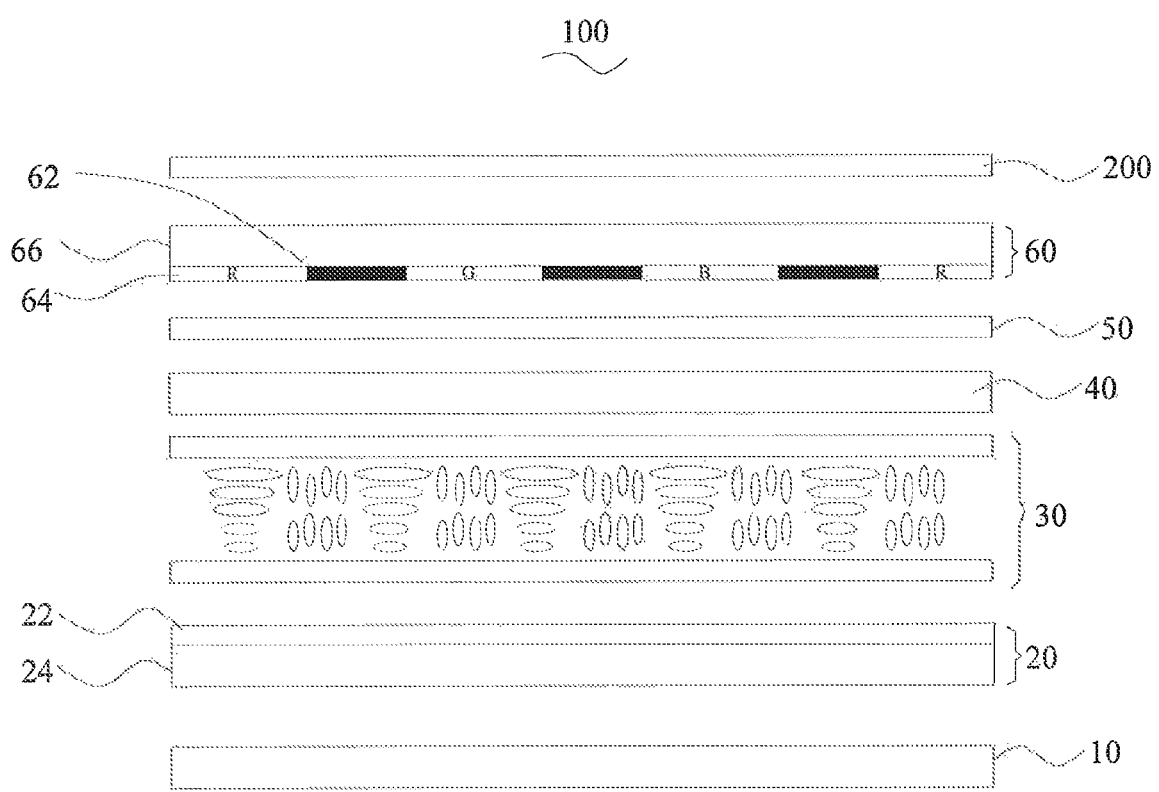
FIG. 1 is a schematic view of a touch screen according to an embodiment.

Referring to FIG. 1, an embodiment of a touch screen 100 includes a lower polarizer 10, a TFT electrode plate 20, a liquid crystal module 30, a common electrode 40, a protective film 50, a filter module 60, and a polarizer module 200, which are laminated sequentially.

The TFT electrode plate 20 includes a glass substrate 24 and a display electrode 22 located on the glass substrate 24. The filter module 60 includes a glass layer 66, a shielding resin 62, and an optical filter 64 which are located on a surface of the glass layer 66.

It should be understood that, when a backlight equipped to touch screen 100 is polarized light, such as OLED polarized light, only the polarizer modules 200 is needed while the lower polarizer 10 and the protective film 50 can be omitted.

In the illustrated embodiment, the structure and function of the lower polarizer 10, the TFT electrode plate 20, the liquid crystal module 30, the common electrode 40, the protective film 50, and the filter module 60 can be similar to the products of the prior art, which will not be discussed in greater details.

The touch screen 100 can be direct lighting type or lateral lighting type liquid crystal display.

Figure 2:
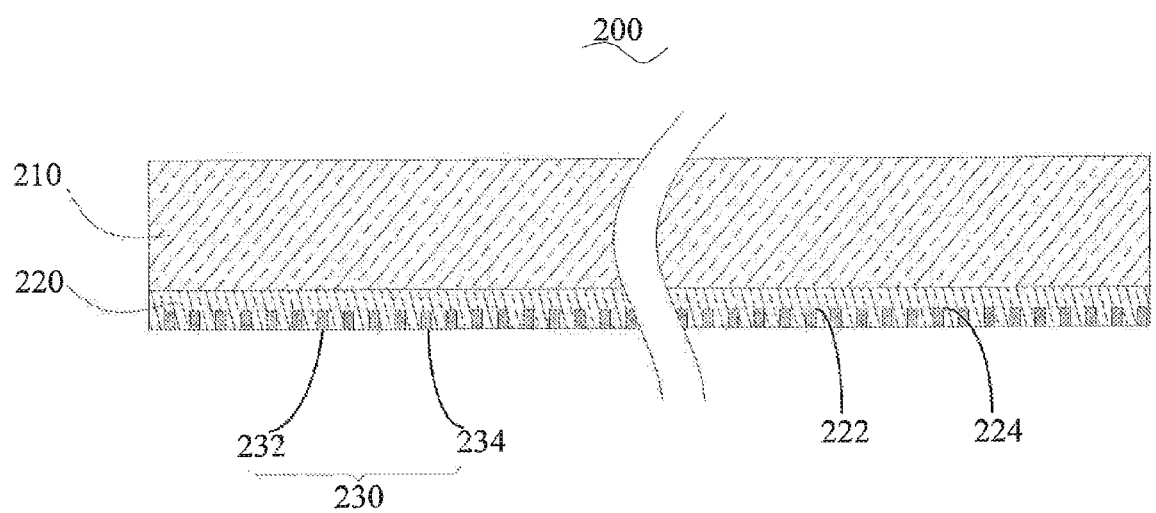
FIG. 2 is a schematic, cross-sectional view of the polarizer module shown in FIG. 1.

Referring to FIG. 2, the polarizer 200 includes a polarizer substrate 210, an adhesive layer 220, and a conductive layer 230, laminated sequentially.

The polarizer substrate 210 is used to convert the incident light into polarized light. In the illustrated embodiment, the polarizer substrate 210 is an organic flexible substrate. A roll-to-roll process can be applied for mass production of the polarizer substrate 210.

The adhesive layer 220 is coated on the polarizer substrate 210. The adhesive layer 220 may have a lower hardness, which is conducive to patterning process.

Figure 3:
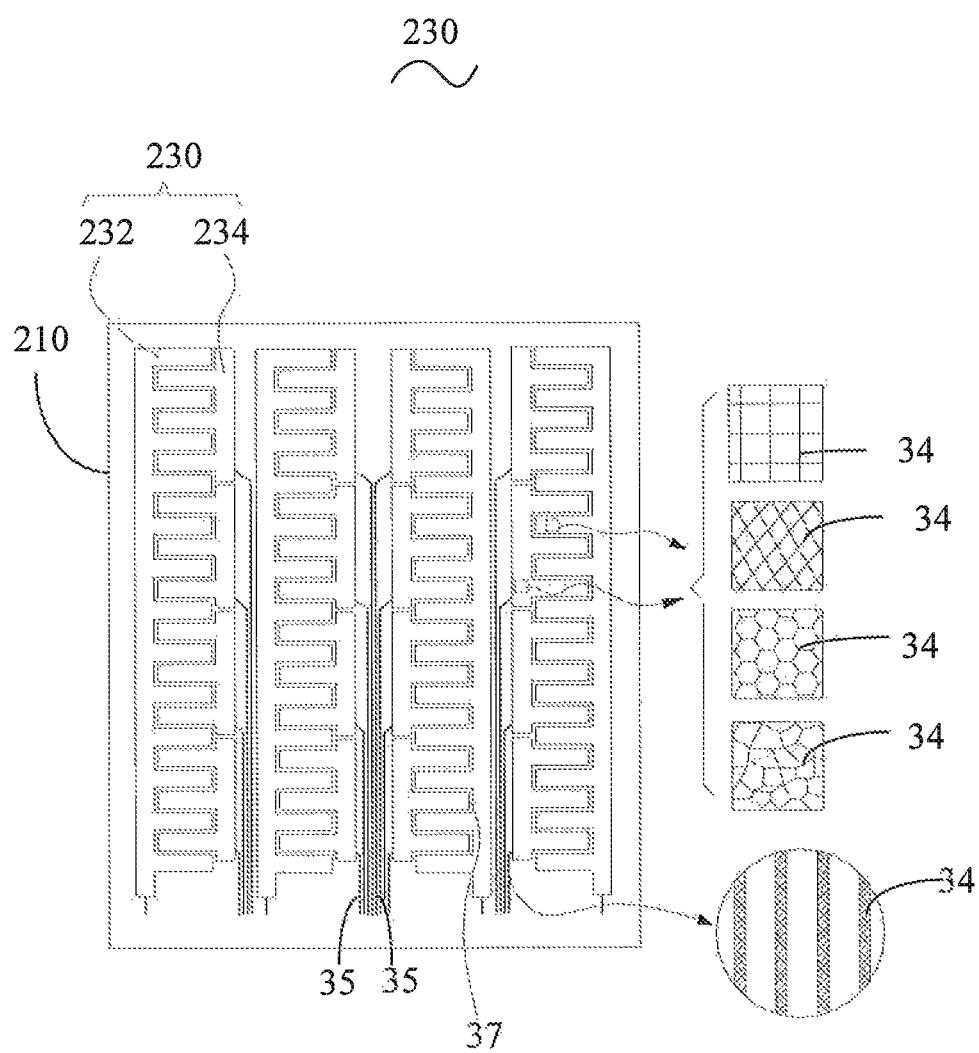
FIG. 3 is a top view of the conductive layer shown in FIG. 2.

Referring to FIG. 2 and FIG. 3, the conductive layer 230 is embedded in the adhesive layer 220. The conductive layer 230 includes a first conductive pattern 232 and a second conductive pattern 234 spaced apart from each other to form a sensing structure. The first conductive pattern 232 and the second conductive pattern 234 are insulated to each other.

The first conductive pattern 232 and the second conductive pattern 234 have single layer multi-point structure, i.e. at least two spaced second conductive patterns 234 are arranged on a side of each first conductive pattern 232. The second conductive patterns 234 arranged on opposite sides of each first conductive pattern 232 are insulated to each other. The first conductive pattern 232 and the second conductive pattern 234 are provided with a lead 35 extending to the edge of the adhesive layer 220. The lead 35 can be a solid wire or a meshed wire.

In the illustrated embodiment, the adhesive layer 220 defines a first groove 222 adapted to the shape of the first conductive pattern 232 and a second groove 224 adapted to the shape of the second conductive pattern 234 by nanoimprint. The first conductive pattern 232 is received in the first groove 222; the second conductive pattern 234 is received in the second groove 224. Furthermore, the thickness of the first conductive pattern 232 is less than or equal to the depth of the first groove 222; the thickness of the second conductive pattern 234 is less than or equal to the depth of the second groove 224.

The first conductive pattern 232 and the second conductive pattern 234 can be conductive meshes formed by a plurality of conductive wires 34 intersecting to each other, respectively. The shape of a grid cell formed by the conductive wires 34 can be regular or random. The conductive wires 34 can be formed by: imprinting the adhesive layer 220 to form grooves corresponding to the shape of the conductive patterns, and then filling a conductive material in the grooves. The conductive material can be selected from the group consisting of metal, carbon nanotube, graphene, organic conductive polymer, and ITO. Preferably, the conductive material is metal (such as nano-silver).

In an embodiment, the conductive wires 34 can be aligned with the mesh lines of a shielding matrix 37 of the optical filter 64 of the filter module 60. In alternative embodiment, the conductive wires 34 can be not aligned with the mesh lines of a shielding matrix 37. When the conductive wires 34 is not aligned with the mesh lines of the shielding matrix 37, in order to guarantee the light transmittance of the filter module 60 and to further guarantee the color rendering of the touch screen 100, the width of the conductive wires 34 is in the range of from 500 nm to 5 μm; which enable the conductive mesh to be visually transparent.

Figure 4:
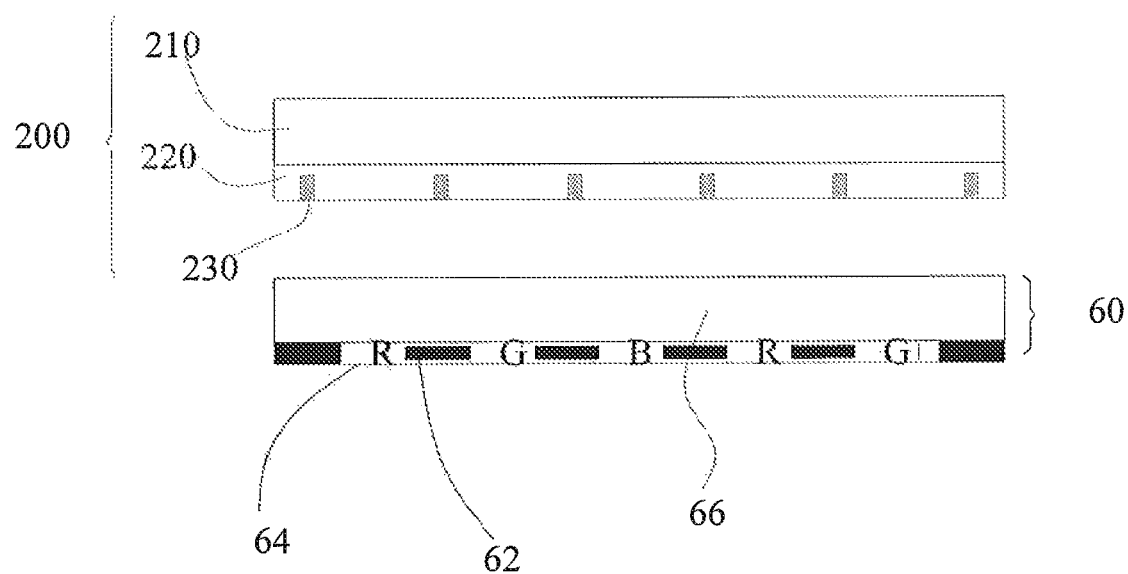
FIG. 4 is a partial, schematic view of the touch screen shown in FIG. 1.

Referring to FIG. 4, in an embodiment, the conductive wires 34 of the first conductive pattern 232 and the second conductive pattern 234 are aligned with the shielding resin or the ink of the filter module 60, i.e. all projections of the conductive wires 34 on the plane of the shielding resin or the ink fall within the shielding resin or the ink exactly. The conductive wires 34 are shielded by the shielding resin or the ink, thus the light transmittance of the touch screen 100 is not affected. Furthermore, the width of the conductive wires 34 is not required to be visual transparency, as long as the width of the conductive wires 34 is less than that of the shielding resin or the ink.

Figure 5A:
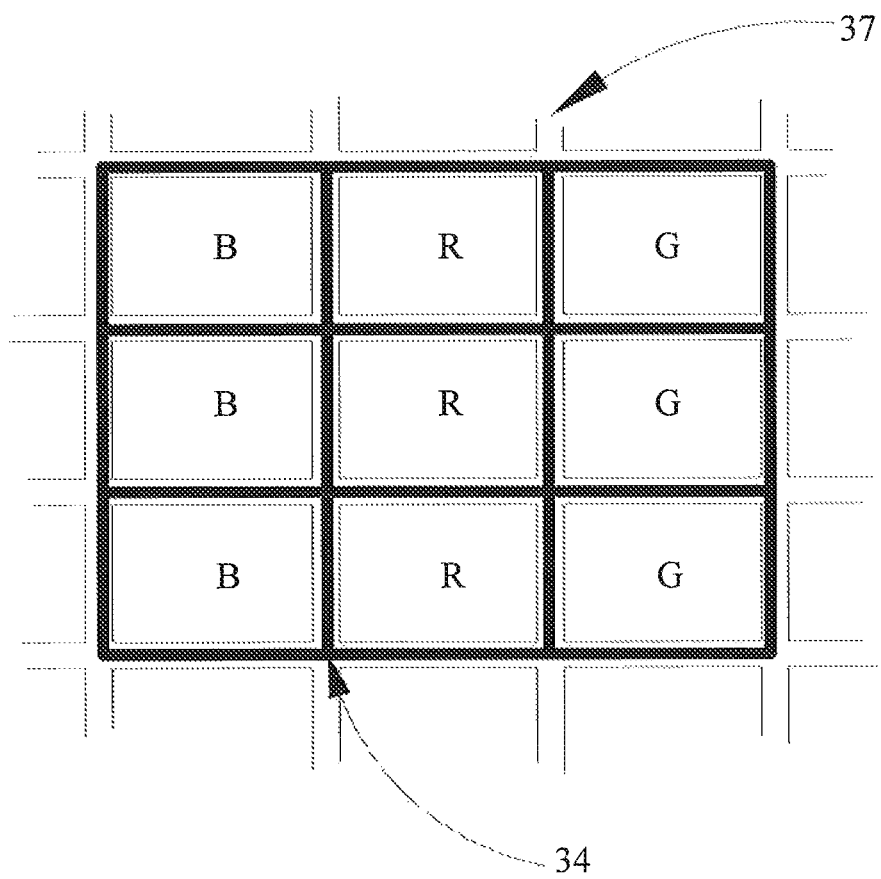
FIG. 5a is top view of a conductive wire according to an embodiment.

Referring to FIG. 5a, in the first conductive pattern 232 and the second conductive pattern 234, the conductive meshes formed by the conductive wires 34 can be rectangular. Furthermore, each grid cell of each conductive mesh is aligned with a filtering grid cell of the shielding matrix 37.

Figure 5B:
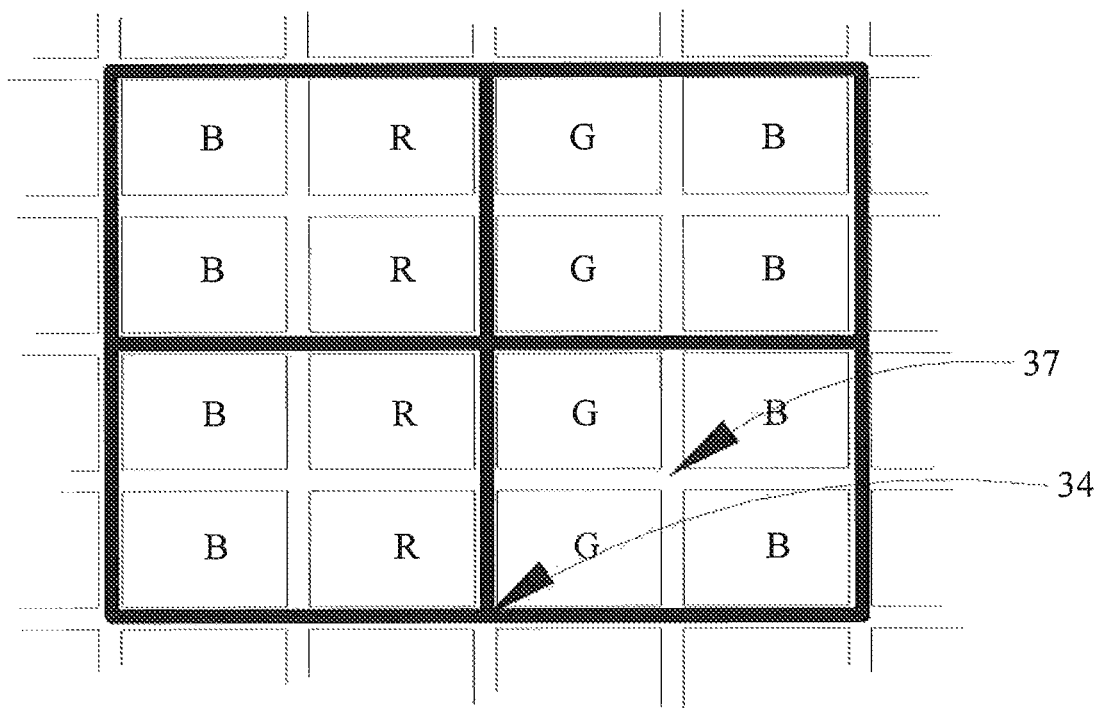
FIG. 5b is a top view of a conductive wire according to another embodiment.

Referring to FIG. 5b, in the first conductive pattern 232 and the second conductive pattern 234, each grid cell of the conductive mesh formed by the conductive wires 34 is aligned with a plurality of filtering grid cells of the shielding matrix 37.

Figure 5C:
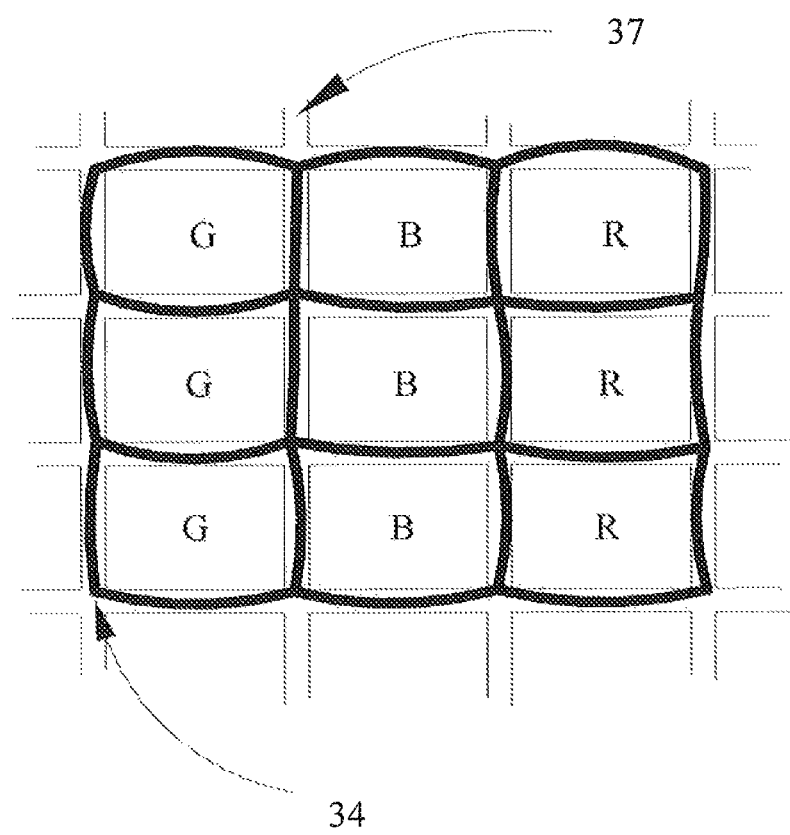
FIG. 5c is a top view of a conductive wire according to another embodiment.
Figure 5D:
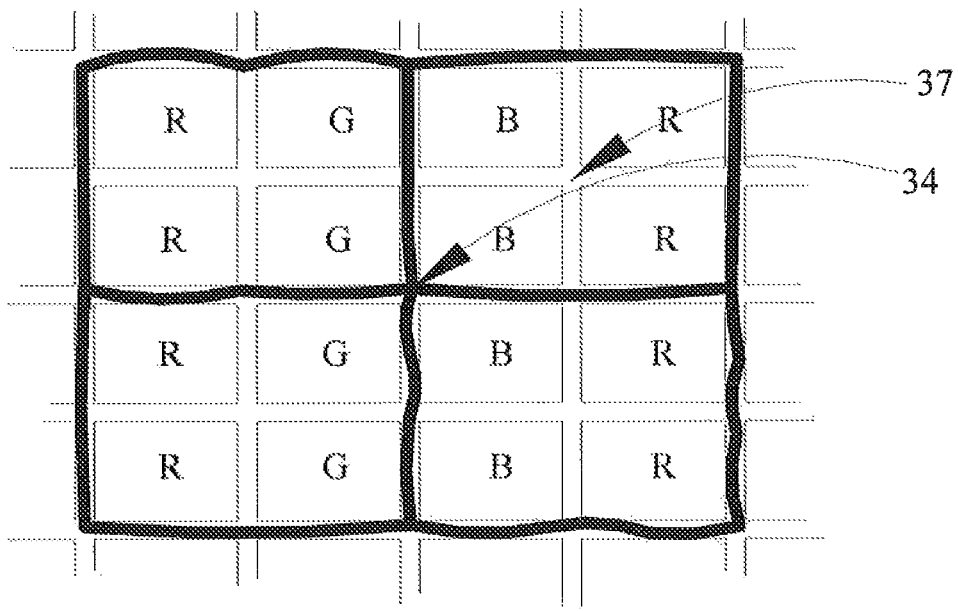
FIG. 5d is a top view of a conductive wire according to another embodiment.

Referring to FIG. 5b again, in the illustrated embodiment, the conductive wires 34 of the conductive mesh are straight lines. Referring to FIGS. 5c and 5d, in the illustrated embodiment, the conductive wires 34 are curved lines; i.e. the shape of grid cell of the conductive mesh can be regular or irregular, as long as the conductive wires 34 are shielded by the shielding resin or the ink.

The conductive layer 230 can be any conventional touch sensing types, such as single layer multi-point structure, double layer multi-point structure and so on.

Figure 6A:
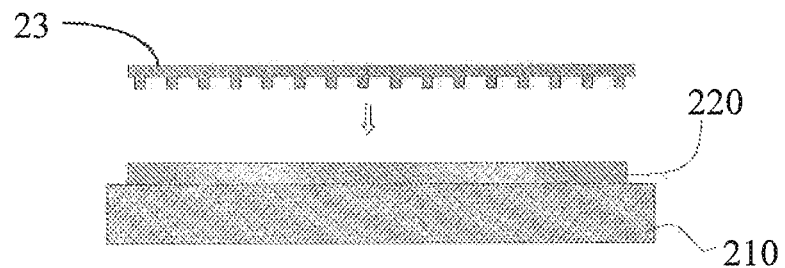
FIG. 6a to FIG. 6c are schematic views of fabrication process of a conductive layer according to an embodiment.
Figure 6B:
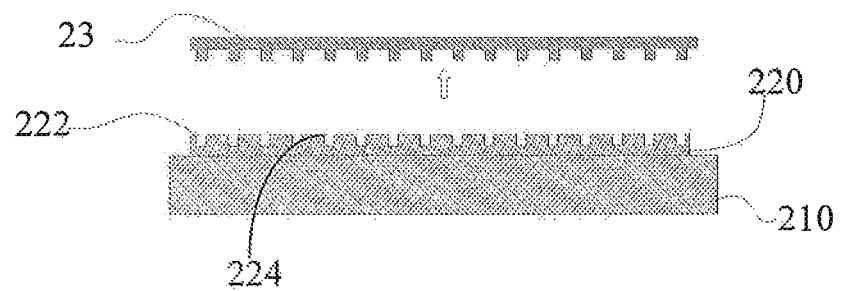
Figure 6C:
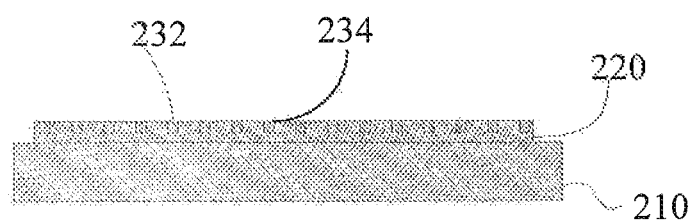
Figure 10:
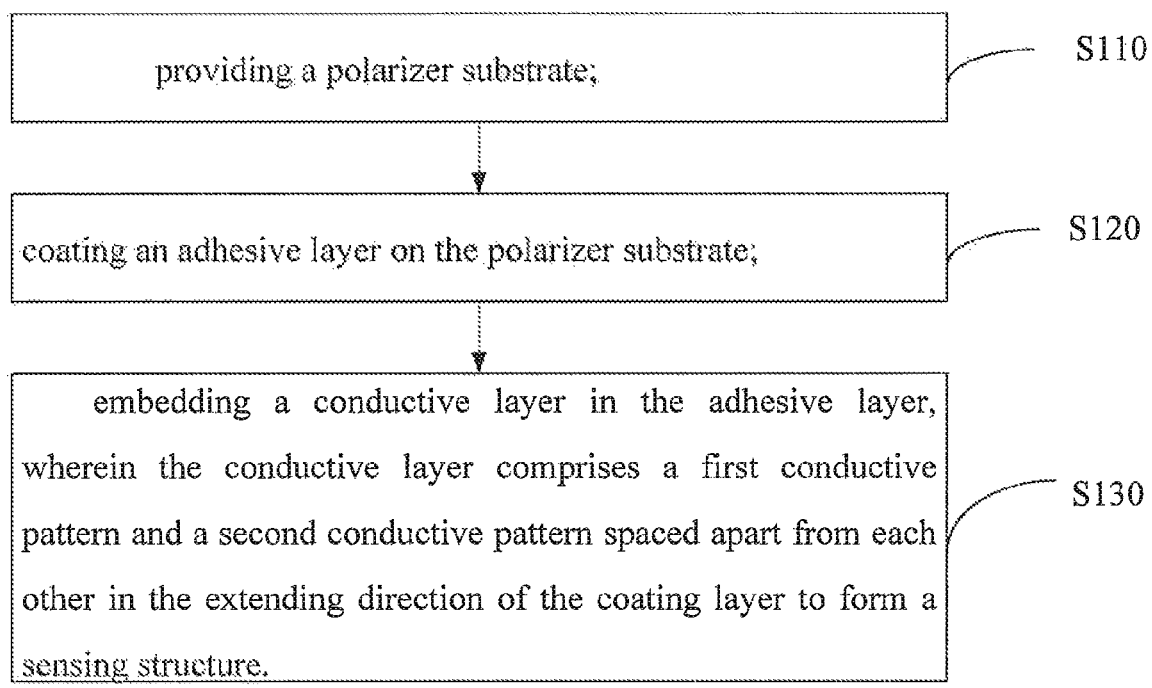
FIG. 10 is process diagram of a method of manufacturing a polarizer module according to an embodiment.

Referring to FIG. 6a to FIG. 6c, the conductive layer 230 has a single layer multi-point structure. Referring to FIG. 10, an embodiment of method of manufacturing the polarizer module 200 includes steps of:

S110, a polarizer substrate 210 is provided.

S120, an adhesive is coated on a surface of the polarizer substrate to form a adhesive layer 220.

S130, a conductive layer is embedded in the adhesive layer, wherein the conductive layer comprises a first conductive pattern and a second conductive pattern spaced apart from each other in the extending direction of the coating layer to form a sensing structure.

Specifically, the adhesive layer 220 is imprinted by imprint mold 23 which are adapted to the shapes of the first conductive pattern 232 and the second conductive pattern 234 respectively; and then the first groove 222 and the second groove 224 are obtained by curing. The imprint mold 23 is shaped as a comb. The adhesive can be UV-glue. The first groove 222 and the second groove 224 are filled with conductive material; then the conductive material is cured to form the first conductive pattern 232 and the second conductive pattern 234, respectively. The first conductive pattern 232 and the second conductive pattern 234 are spaced apart from each other to form the conductive layer 230 with a sensing structure.

Figure 7:
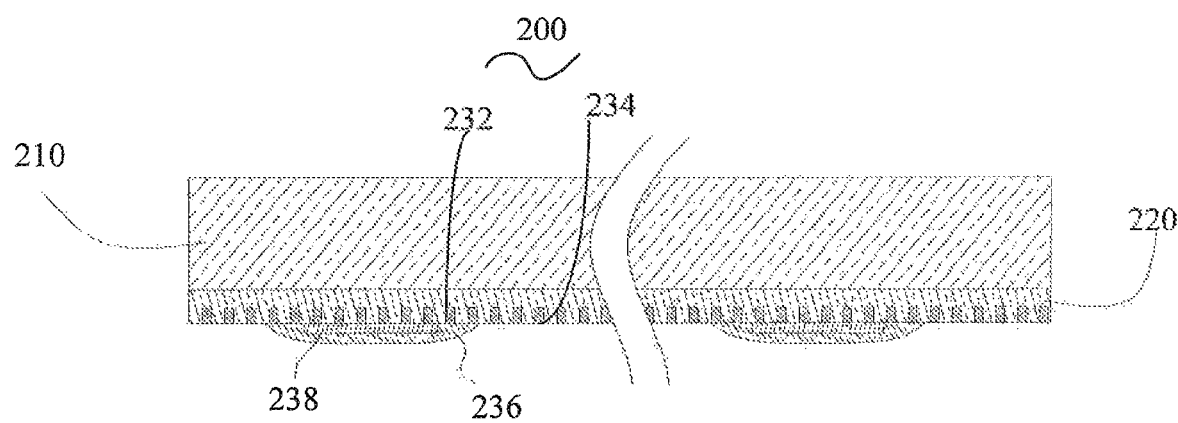
FIG. 7 is a schematic, cross-sectional view of a polarizer module according to another embodiment.
Figure 8:
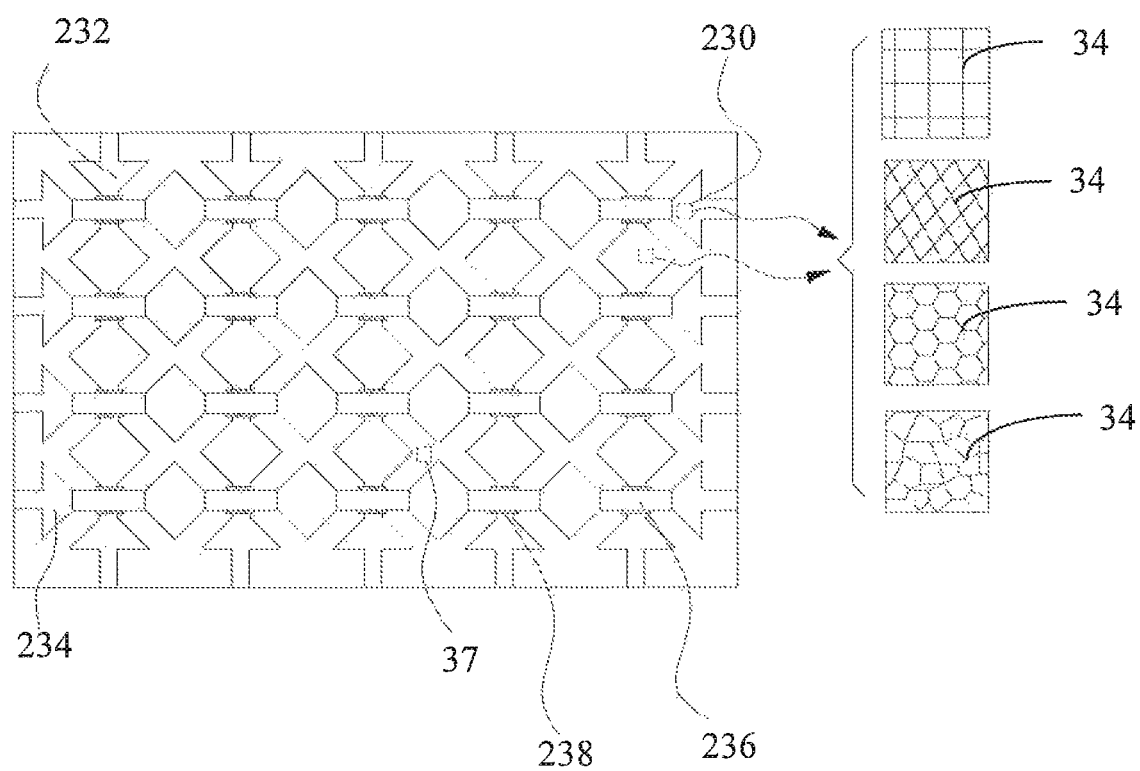
FIG. 8 is a top view of the conductive layer shown in FIG. 7.

Referring to FIG. 7 and FIG. 8, in an alternative embodiment, the conductive layer 230 further includes a conductive bridge 236 crossing on the first conductive pattern 232. The conductive bridge 236 and the first conductive pattern 232 are provided with an insulating layer 238 located therebetween. The conductive bridge 236 electrically interconnects two second conductive patterns 234 arranged on both sides of the first conductive pattern 232, respectively. In the illustrated embodiment, the conductive bridge 236 is embedded in the adhesive layer 220. The insulating layer 238 is a glue layer.

Figure 9:
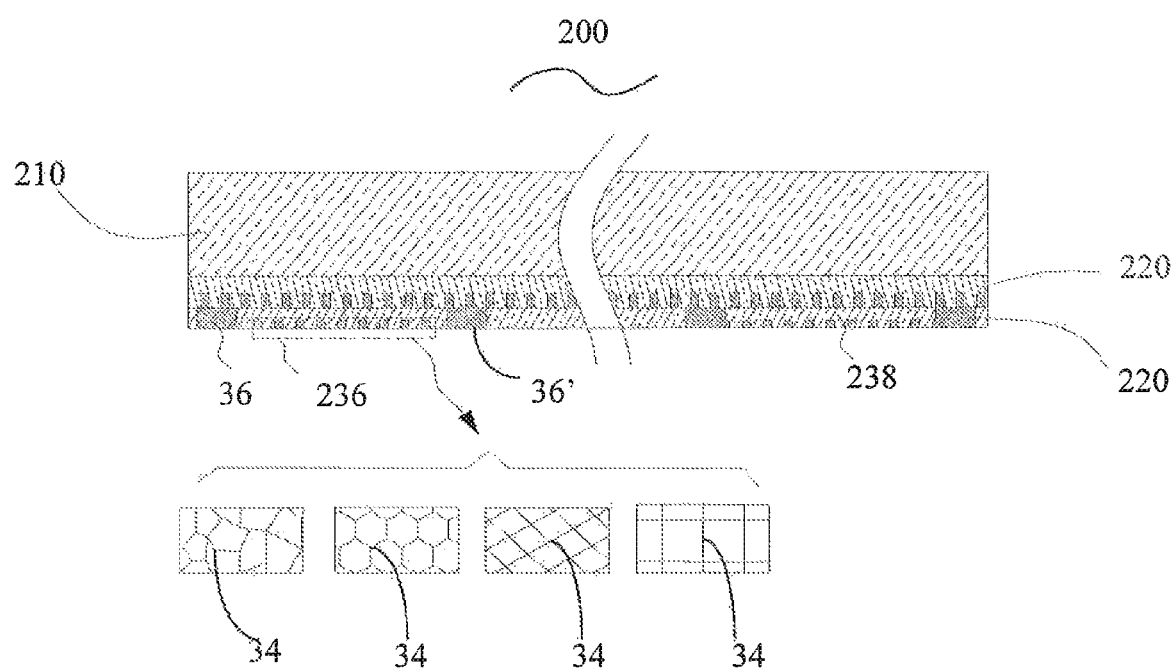
FIG. 9 is schematic, cross-sectional view of a polarizer module according to another embodiment.

Referring to FIG. 9, the conductive bridge 236 is made of transparent conductive material, which can help to improve the light transmittance of the polarizer module 200. In the illustrated embodiment, the conductive bridge 236 is formed by a plurality of conductive wires 34 intersecting to each other. Furthermore, the conductive bridge 236 is provided with a first conductive block 36 and a second conductive block 36' on both ends thereof, respectively. The surface areas of the first conductive block 36 and the second conductive block 36' are greater than that of the conductive bridge 236; thus the contact surface between the conductive bridge 236 and the conductive pattern 234 is much greater, which can help to ensure the effectiveness of the electrical connection. Furthermore, the first conductive block 36 is electrically coupled to at least two conductive wires 34 of the corresponding second conductive patterns 234, the second conductive block 36' is electrically coupled to at least two conductive wires 34 of the corresponding second conductive patterns 234 (If one of the conductive wires 34 is disconnected; the other can still be connected).

The conductive bridge 236 can also be formed by imprinting. For example, a meshed conductive bridge 236 can be formed by imprinting in one step. In an alternative embodiment, the conductive bridge 236 can be formed by: forming a plug hole of the conductive block by lithographic exposure, firstly; then a meshed groove is formed by imprinting; finally, the conductive material is filled in the meshed groove to form the meshed conductive bridge 236 and the conductive block.

The present disclosure also has the following advantages:

(1) the polarizer module of the present disclosure can implement touch operation and output polarization light at the same time. There is no need to assembly a touch screen on the display panel, which can help to reduce the thickness of the electronic devices and save the material and the assembly cost greatly.

(2) the conductive patterns of the present disclosure are formed by a plurality of meshes, the visual transparency can be obtained by controlling the width and the density of the line of the mesh. The material of the conductive patterns can be expanded from the conventional transparent material to various kinds of conductive material. When the conductive patterns are made of metal, the resistance can be reduced greatly, thus the power consumption of the touch screen can be further reduced.

(3) the conductive patterns can be formed by pattern etching (film forming —exposure—development—etching) in one step. Since all conductive patterns can be formed by imprinting in one step, which simplifies the manufacture procedure greatly. Furthermore, comparing with etching the whole conductive layer after the conductive layer is formed on the surface of the substrate, the conductive patterns is formed by filling conductive material to the groove after the pattern imprinting, which save conductive material greatly. Particularly, the cost is saved greatly when expensive conductive material is used, such as TIO.

(4) the lead of the conductive pattern is meshed, the conductive material is prone to retain in the groove when the conductive material is filled. Furthermore, when the nano-silver is sintered, the phenomenon of the breakage of the electrode lead due to the spread silver ball produced by an agglomeration effect is avoided.

It should be understood that the descriptions of the examples are specific and detailed, but those descriptions can't be used to limit the present disclosure. Therefore, the scope of protective of the disclosure patent should be subject to the appended claims.

What is claimed is:

1. A polarizer module, comprising: a polarizer substrate; an adhesive layer coated on the polarizer substrate; a conductive layer embedded in the adhesive layer, wherein the conductive layer comprises a first conductive pattern and a second conductive pattern spaced apart from each other in the extending direction of the adhesive layer to form a sensing structure, wherein the first conductive pattern and the second conductive pattern are conductive meshes formed by a plurality of conductive wires intersecting to each other; and a conductive bridge interconnecting two second conductive patterns arranged on opposite sides of the first conductive pattern, wherein an insulating layer is provided between the conductive bridge and the first conductive pattern, wherein the conductive bridge is embedded in the adhesive layer, a portion of the adhesive lager located between the conductive bridge and the first conductive pattern forming the insulating layer;

wherein the adhesive layer defines a first groove adapted to the shape of the first conductive pattern and a second groove adapted to the shape of the second conductive pattern, the first conductive pattern is received in the first groove, the second conductive pattern is received in the second groove; and wherein a thickness of the first conductive pattern is less than or equal to a depth of the first groove, a thickness of the second conductive pattern is less than or equal to a depth of the second groove.

2. The polarizer module according to claim 1, wherein the conductive wires are made of metal.

3. The polarizer module according to claim 1, wherein a width of the conductive wires is ranged from 500 nm to 5 μm.

4. The polarizer module according to claim 1, wherein the conductive bridge is made of transparent conductive material.

5. The polarizer module according to claim 1, wherein the conductive bridge comprises a first conductive block and a second conductive block at opposite ends thereof, the first conductive block and the second conductive block are electrically coupled to the two second conductive patterns arranged on opposite sides of the first conductive pattern.

6. The polarizer module according to claim 5, wherein the first conductive block is electrically coupled to at least two conductive wires of the corresponding second conductive pattern, and the second conductive block is electrically coupled to at least two conductive wires of the corresponding second conductive pattern.

7. The polarizer module according to claim 1, wherein at least two spaced second conductive patterns are arranged on a side of each first conductive pattern, and the second conductive patterns arranged on both sides of each first conductive pattern are insulated to each other.

8. The polarizer module according to claim 1, wherein the polarizer substrate is an organic flexible substrate.

9. A touch screen, comprising a TFT electrode, liquid crystal module, a common electrode, an optical filter module, and the polarizer module according to claim 1, which are laminated sequentially.

10. The touch screen according to claim 9, wherein the adhesive layer, the first conductive pattern, and the second conductive pattern are sandwiched between the polarizer substrate and the filter module.

* * * * *